March 19, 1963

E. L. BISHOP ET AL 3,081,743

AIR ACTUATED MOTOR UNIT

Filed April 12, 1961

INVENTORS
EARL L. BISHOP AND
OSCAR W. PELKEY
BY Teare, Fetzer & Teare

INVENTORS
EARL L BISHOP AND
OSCAR L PELKEY
BY
Teare, Fetzer & Teare

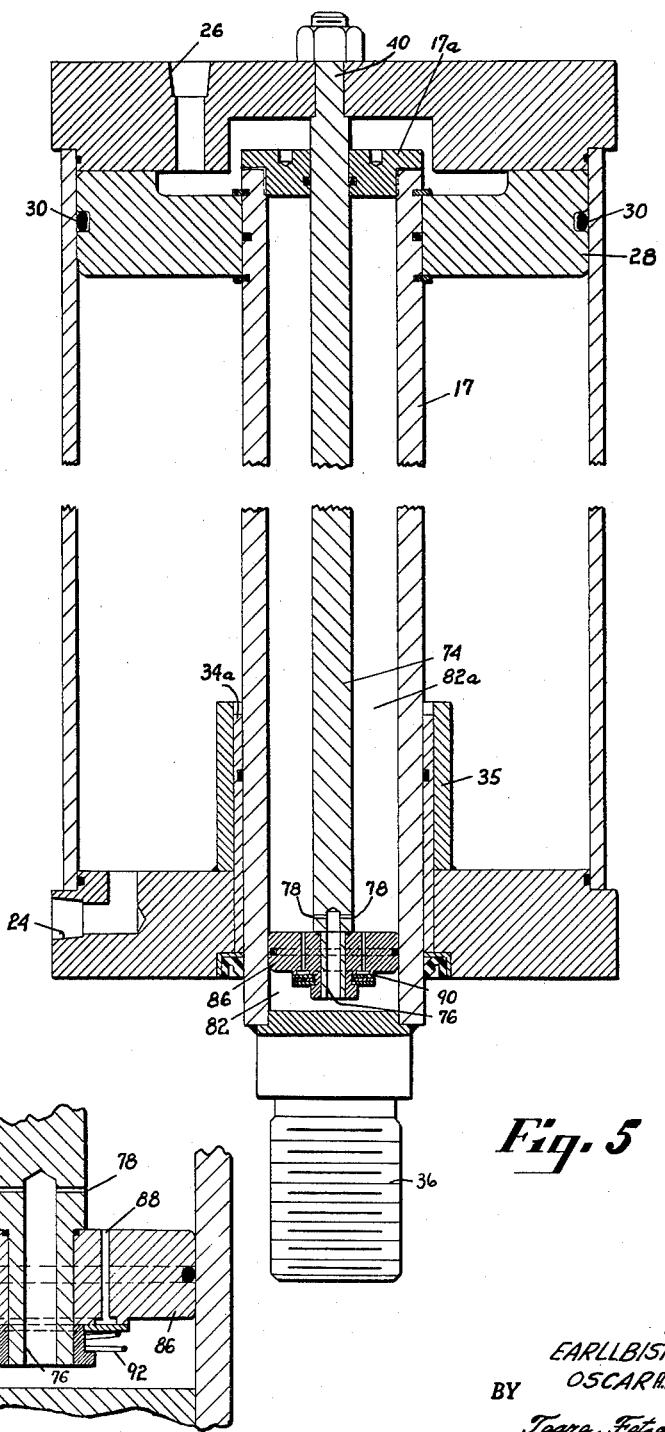

March 19, 1963 E. L. BISHOP ET AL 3,081,743
AIR ACTUATED MOTOR UNIT
Filed April 12, 1961 5 Sheets-Sheet 5
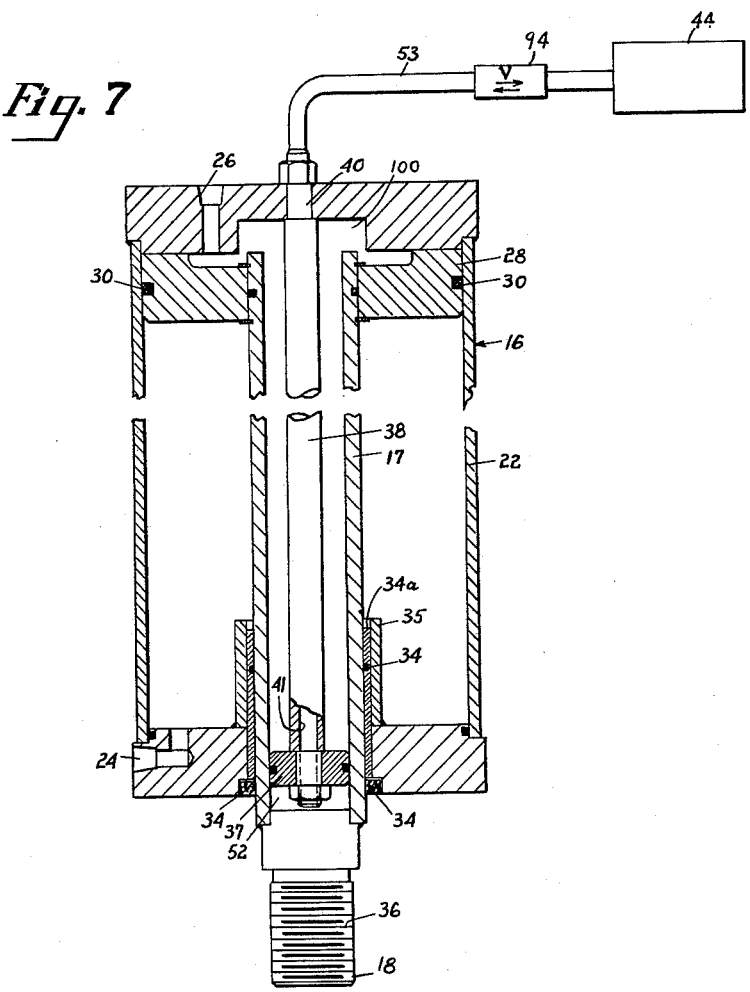
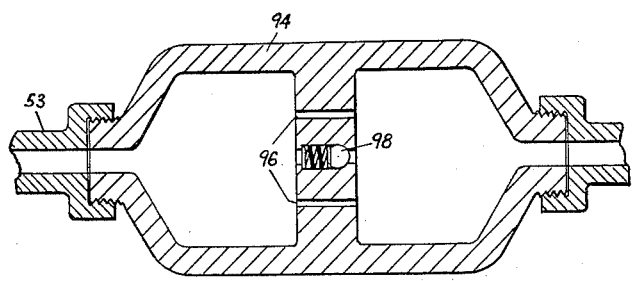
INVENTORS
EARL L. BISHOP AND
OSCAR R. PELKEY
BY
Teare, Fetzer & Teare 3,081,743
AIR ACTUATED MOTOR UNIT
Earl L. Bishop, Cuyahoga Falls, and Oscar A. Pelkey, Greenwich, Ohio, assignors to The Akron Standard Mold Company, Akron, Ohio, a corporation of Ohio
Filed Apr. 12, 1961, Ser. No. 102,433
10 Claims. (Cl. 121—38)

This invention relates in general to air actuated motor units, and more particularly to an air actuated, reciprocal type motor unit embodying a liquid checking device therewith, to provide a combined air actuated motor unit and liquid checking device particularly adapted for use on power actuated machinery.

Air actuated motor units are conventionally used to actuate and control many types or classes of power actuated machines. One such conventional use may be an air actuated motor unit for actuating a press, such as the type of press utilized to mold rubber goods, for instance rubber tires and the like, and wherein the press comprises a reciprocal type piston and cylinder, air actuated motor unit or units associated with a platen member of the press, for powered movement of the press platen and an associated mold. However, since air is a relatively easily compressible fluid, the movement of the motor unit particularly during stripping of the mold from the formed tire may be erratic, producing a jerky action during the travel of the piston of the motor unit.

The present invention provides an air actuated motor unit for actuating or controlling relatively heavy machinery, such as for instance the aforementioned press, wherein there is combined with the motor unit a liquid checking or braking device, for preventing the aforementioned jerkiness of travel inherent in conventional air actuated motor units.

Accordingly, an object of the invention is to provide an improved air actuated motor unit for use in actuating or controlling machinery.

Another object of the invention is to provide an improved air actuated motor unit with which is associated a liquid checking or braking device, for providing for smooth operation of the motor unit.

A still further object of the invention is to provide an air actuated motor mechanism of the latter type, wherein the checking device is built into the motor for convenient installation of the motor mechanism and checking device as a packaged unit.

A still further object of the invention is to provide an air actuated motor unit which comprises a cylinder and a movable piston disposed therein, with a hollow piston rod secured to the piston and extending exteriorly of the cylinder, and wherein a relatively stationary secondary piston is disposed in the hollow piston rod, for coaction with resistance liquid in the hollow piston and acting as a checking device to improve the smoothness of operation of the motor unit.

A still further object of the invention is to provide an air actuated motor unit of the latter type wherein said secondary piston is orificed, and is provided with valve means, for permitting differential flow of resistance liquid from one side of the secondary piston member to the other side thereof.

Other objects and advantages of the invention will be apparent from the following description taken in conjunction with the accompanying drawings wherein:

FIG. 5 is a view generally similar to FIG. 3, but illustrating a further embodiment of the invention;

FIG. 6 is an enlarged, fragmentary, sectional view of the stationary secondary piston member and associated valve means of the FIG. 5 arrangement;

FIG. 7 is an enlarged, vertically sectioned, partially diagrammatic view of a further embodiment of an air actuated motor unit and associated liquid checking system constructed in accordance with the instant invention; the arrangement is somewhat similar to that of FIG. 3;

FIG. 8 is an enlarged, sectional generally diagrammatic view of the control valve used with the system of FIG. 7.

Figure 1:
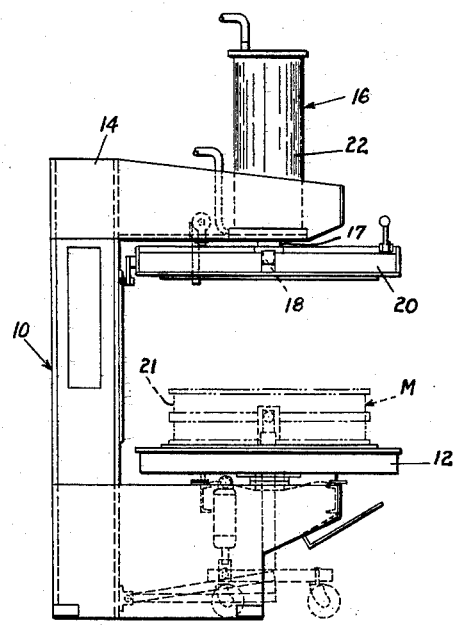
FIG. 1 is a side elevational view of a tire making press embodying an air actuated motor unit constructed in accordance with the instant invention.
Figure 2:
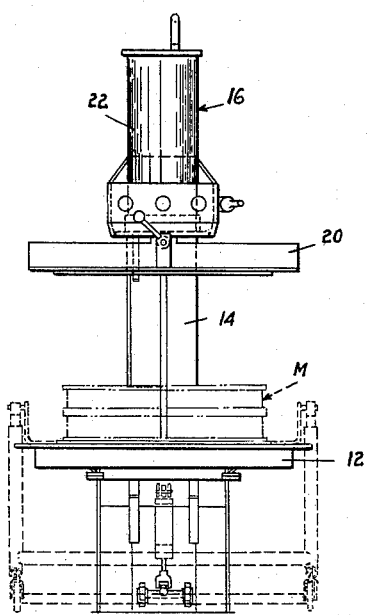
FIG. 2 is an end elevational view of the press taken generally from the right hand side of FIG. 1.

Referring now to the drawings, there is illustrated a press 10 of a known type utilized in the production of rubber tires. Briefly, the press comprises a bed plate 12 on which rests a two-part mold M, used for molding a tire. The press includes a frame 14 on which is supported an air actuated motor unit 16 of the type of the instant invention. The piston rod 17 of the motor unit is connected, as at 18, to movable upper platen 20 of the press. The upper platen 20 is adapted to be lowered by the motor unit into engagement with the upper half of the mold M, and includes clamping means of any suitable type for coupling the upper platen to the underlying half of the mold. When the mold is ready to be opened after formation of the tire, the motor unit 16 is actuated by means of pressurized air to raise the upper platen and coupled top half 21 of the mold, and thus strip the upper half of the mold from the tire.

The motor unit 16 comprises a cylinder or body portion 22 supported on frame 14, with such cylinder including air distributing ports 24 and 26 (FIG. 3) for injecting and exhausting actuating fluid or air into and from the respective chamber of the cylinder. A piston 28 is disposed in the cylinder for reciprocal movement therein and may include packing or sealing means 30 for sealing engagement with the cylinder walls. In accordance with the instant invention, the piston rod 17 of piston 28 is hollow and may be sealed from the interior of the air motor unit, as by means of removable, preferably threaded cap member 17a. Rod 17 extends outwardly of the cylinder to be connected, as aforementioned at 18, to the upper platen 20 of the press. Packing or sealing means 34 of any suitable type, which in the embodiment illustrated includes a bearing sleeve 34a, may be utilized for sealing engagement between the movable piston rod 17 and the encompassing surfaces of the cylinder body. Such surfaces include an upstanding apertured boss 35 encircling sleeve 34a. Piston rod 17 at its lower end may be threaded, as at 36, for ready attachment to the upper platen 20 of the aforementioned press. A relatively stationary, secondary piston 37 and associated piston rod 38 is disposed in the hollow piston rod 17 with such piston rod 38 being anchored as at 40 to the upper end of the cylinder body 22 of the motor unit. When actuating fluid or air is forced through port 24 of the cylinder body, the piston 28 is caused to move upwardly, thus moving the hollow piston rod 17 upwardly therewith, and raising the platen, while the air in the cylinder body on the opposite side of piston 28 is exhausted via port 26. Reverse application of the actuating air causes reverse movement of the piston in the cylinder body, thus lowering the attached platen 20.

In accordance with the instant invention and in order to provide for smooth movement of the piston 28 in the cylinder body, the piston 37 and associated piston rod 38 may be provided with an axially extending passageway 41 completely therethrough. Passageway 41 is connected as by means of preferably adjustable flow control or check valve 42 of known type to an atmospheric type storage reservoir tank of resistance liquid, which tank 44 is connected via feed line 45, 45a back to opening 46 in the hollow piston rod, which opening communicates with the interior of the rod via passageway 48. Portion 45a of the feed line should of course possess sufficient slack to provide for travel of the piston rod 17. A check valve 50 is also provided in line 45, 45a to prevent reverse flow of fluid from the interior of the hollow piston rod 17 via line 45a, 45 to the liquid storage tank 44. Flow control valve 42 may be adjustable for varying the rate of flow of liquid from the interior of the hollow piston rod 17 up through the passageway. Thus it will be seen upon actuation of the piston 28 upwardly due to entry of pressurized air via port 24 into cylinder body 22, the resistance liquid which completely fills solely the chamber 52 of the hollow piston rod 17 is compressed since the hollow piston rod moves upwardly with the piston 28 and the resistance liquid flows in a controlled manner through passageway 41, via flow control or check valve 42, and then to the storage tank 44. Upon entry of the actuating fluid into port 26 of the cylinder member 22, the piston member 28 is caused to move downwardly thereby moving the hollow piston rod downwardly and causing liquid to flow from the reservoir via valve 50 back into the hollow piston rod member 17. On such downward stroke, flow control valve 42 does not function, and thus no liquid flows into chamber 52 via line 53. Thus there has been provided a controlled smooth actuation of the piston 28 of the main motor unit, to provide for smooth actuation of the upper platen and coupled mold in its stripping movement from the tire, or in other words, controlled movement of the piston 28 is accomplished in one direction (e.g. an upward direction), while generally free movement of the piston 28 is permitted in the opposite or downward direction, as the resistance liquid (e.g. oil) is sucked into chamber 52 of the hollow piston rod member 17.

Figure 4:
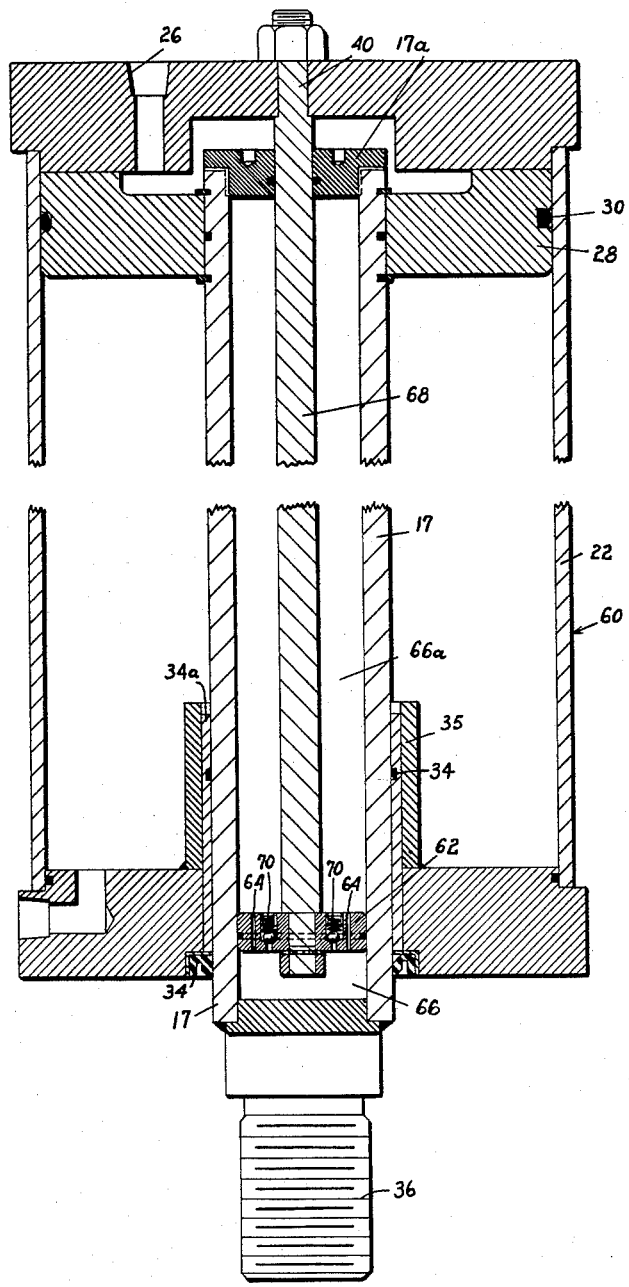
FIG. 4 is a view generally similar to FIG. 3, but illustrating a modified form of the air actuated motor unit.

Referring now to FIG. 4, there is illustrated a modified form of a liquid checking device for controlling in smooth relation, the movement of the associated piston 28 of the air actuated motor unit 60. In this modified form, the secondary, stationary piston 62 of the motor unit is provided with a plurality of orifices 64 extending therethrough, whereby the resistance liquid completely filling chambers 66, 66a of piston rod 17, may flow from one side of the piston head 62 to the other side thereof in a predetermined controlled manner during movement of piston rod 17. Piston 62 is supported by stationary piston rod 68. In addition, the piston 62 is provided with a plurality of ball check valves 70 mounted therein in spring loaded relation, for permitting more rapid flow of the resistance fluid from one side to the other side of the piston 62 during movement in one axial direction of the associated hollow piston rod 17 of the main piston 28 of the motor unit. It will be noted that in this embodiment, the rapid portion of the stroke of piston rod member 17 is during inward movement of the piston rod 17, while the more controlled portion of the stroke is during outward movement of rod 17, during which time the resistance liquid flows only through orifices 64. Check valve mechanism 70 could be eliminated wherein the more controlled movement of rod 17 would occur in both axial directions. Boss 35 may be adapted for limiting outward movement of rod 17 and attached piston head 28.

Referring now to FIGS. 5 and 6, there is shown a further modified form of the liquid checking device, wherein the secondary, stationary piston rod 74 is provided with an axial passageway 76 communicating at its upper end with radially extending orifices 78, to thus provide for predetermined controlled movement of the resistance liquid from one side or chamber 82 of the piston head 86 to the other side 82a thereof, during relative movement between the hollow piston rod 17 and the relatively stationary piston head 86. Moreover, there are provided a plurality of passageways 88 extending through the piston head 86, and wherein there is provided a disc valve 90 supported by spring means 92 on the lower end of the relatively stationary piston rod 74 of the auxiliary piston, which spring means operates to maintain the passageways in closed position during relative upward or inward movement of the hollow piston rod 17 and the main air actuated piston head 28 of the motor unit with respect to the stationary piston 86, but which permits opening of such disc valve upon relative downward or outward movement of the hollow piston rod 17 with respect to the relative stationary auxiliary piston head 86, to thus provide for relatively rapid return movement of the hollow piston rod 17.

Figure 3:
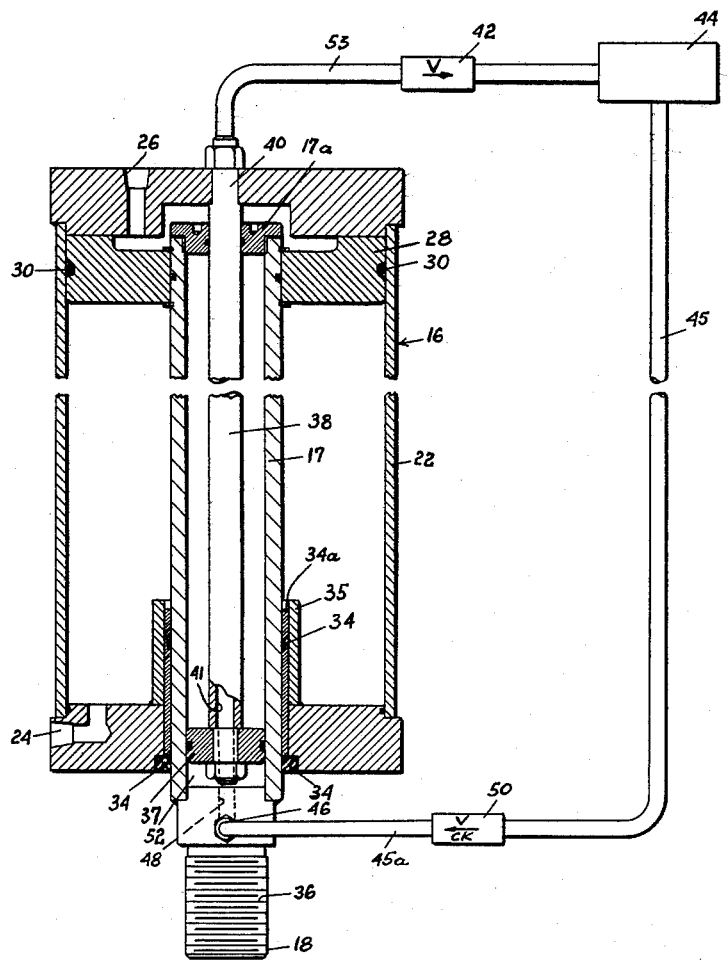
FIG. 3 is an enlarged vertically sectioned, partially diagrammatic view of an air actuated motor unit and associated liquid checking system constructed in accordance with the instant invention.

Referring now to FIGS. 7 and 8, in this embodiment only lower chamber 52 of the hollow piston rod 17 has resistance liquid therein, similar to that of FIG. 3. However, the flow control valve 94 disposed in line 53 controls the flow of fluid therethrough when the main piston head 28 and associated piston rod 17 are moved upwardly, thereby causing the resistance liquid to flow in controlled manner through passageway 41 via valve 94 to the atmospheric storage tank 44 of resistance liquid. On the downward stroke of the piston head 28 and associated rod 17, the liquid is more or less freely drawn back through valve 94 and through passageway 41 into chamber 52 and thus there is no controlled movement. In other words it will be seen that the FIG. 7 arrangement eliminates line 45, 45a and check valve 50 of the FIG. 3 arrangement. Valve 94, in order to control the liquid flow in one direction, may comprise orifices 96, which may be adjustable for varying the degree of flow control, and may include spring loaded check means 98 for permitting generally free flow of liquid in the opposite direction, or in other words during the downward or outward stroke of the piston 28 and associated rod 17. It will also be noted that the FIG. 7 arrangement has eliminated the cap member 17a of the FIG. 3 arrangement, thereby permitting completely free communication between the upper chamber 100 of the air cylinder 22 and the interior of rod 17 above stationary piston head 37.

From the foregoing discussion and accompanying drawings it will be seen that the present invention provides a novel air actuated motor unit embodying a liquid checking device therewith for providing for smooth controlled operation of the piston of the motor unit so that it will not hesitate or falter under load in its cycle of operation, and especially a motor unit adapted for mounting on, for instance, a press of a molding machine, such as a tire molding machine, and which may accomplish stripping of the mold from the molded product in an expeditious manner.

The invention also provides an air actuated motor unit embodying a hollow piston rod member with a relatively stationary auxiliary piston head and piston rod disposed in said rod member, and adapted for coaction with resistance liquid in a controlled manner, to provide for optimum smooth operation of the piston head of the main air actuated motor unit.

The terms and expressions which have been used are used as terms of description, and not of limitation, and there is no intention in the use of such terms and expressions of excluding any equivalents of any of the features shown or described, or portions thereof, but it is recognized that various modifications are possible within the scope of the invention claimed.

We claim:

1. In combination, an air actuated, reciprocal type motor unit comprising a cylinder, a main piston head disposed in said cylinder, a hollow piston rod secured to said piston head and extending outwardly of said cylinder, a secondary piston head disposed in fluid sealing relation in said hollow piston rod, a secondary piston rod secured to the secondary piston head at one end and being attached at its other end to said cylinder, said main piston head and hollow piston rod being movable relative to said secondary piston head and attached secondary piston rod, said hollow piston rod being adapted for attachment to a movable member, and liquid checking means associated with said secondary piston and hollow piston rod member for controlling the movement of said main piston head and hollow piston rod member upon actuation of said motor unit, said liquid checking means including means operating automatically in response to reversal of the stroke of said main piston head and associated hollow piston rod to at least partially deactivate said checking means and permit relatively rapid return of said main piston head and hollow piston rod.

2. The combination in accordance with claim 1, wherein said secondary piston is orificed for controlled movement of resistance liquid from one side of said secondary piston head to the other side thereof, and wherein there is provided check valve means extending through said secondary piston head for increasing the flow of resistance liquid therethrough upon actuation of said main piston head in one predetermined direction.

3. The combination in accordance with claim 2 wherein said check valve means comprises a plurality of spring actuated ball check devices.

4. The combination in accordance with claim 2 wherein said check valve means comprises a spring loaded disc valve.

5. The combination in accordance with claim 1, wherein the liquid checking means comprises an axial passageway extending completely through said secondary piston head including said secondary piston rod, and wherein a flow control valve is operative to pass resistance liquid therethrough in opposite directions corresponding to the direction of movement of said hollow piston rod, said valve communicating with said passageway, and is adapted for connection to a reservoir tank of resistance liquid, said valve providing a predetermined resistance to liquid flow in one direction and a materially lesser resistance to liquid flow in the opposite direction.

6. An air actuated reciprocal type motor unit comprising a cylindrical-like housing portion, a main piston including a pitson head and a hollow piston rod disposed in said housing portion for reciprocal movement therein, said hollow piston rod extending outwardly of said housing, means on opposite sides of said piston head for injecting and exhausting actuating fluid into and from said housing, a secondary piston disposed in fluid sealing relation in said hollow piston rod, means maintaining said secondary piston stationary with respect to said housing upon actuation of the main piston, a secondary piston rod having an axial passageway extending completely therethrough, the secondary piston head dividing said hollow piston rod into a lower and an upper chamber, said lower chamber being adapted to receive therein a supply of resistance liquid, a flow control valve operative to pass liquid in only one direction being connected to said passageway through said secondary piston rod, a storage tank of resistance liquid connected to a conduit communicating with said flow control valve for receiving liquid flowing through said valve from said lower chamber, conduit means communicating from said storage tank back to said lower chamber, and a check valve disposed in said conduit means operative to pass resistance liquid in a direction only from said storage tank to said lower chamber.

7. In combination, an air actuated reciprocal type motor unit comprising a housing and a main piston including a piston head and a hollow piston rod disposed in said housing for reciprocal movement therein, said hollow piston rod being closed at its ends and extending at one end thereof outwardly of said housing, a liquid braking device disposed in said hollow piston rod and being operative to control the movement of said main piston, said braking device comprising a secondary piston disposed in fluid sealing relation in said hollow piston rod and dividing the hollow piston rod into a plurality of chambers, a secondary piston rod being attached to said housing for maintaining said secondary piston stationary with respect to said hollow piston rod upon actuation of said air actuated motor unit, resistance liquid completely filling said chambers, said secondary piston comprising a plurality of orifices of predetermined size extending therethrough for passing resistance liquid in a controlled manner from one of said chambers to the other of said chambers, and means for attaching said hollow piston rod to a movable member, said braking device providing for smooth actuation of said motor unit under load, without erratic movement of said main piston.

8. The combination in accordance with claim 7, wherein said secondary piston includes passageway means extending therethrough from one of said chambers to the other of said chambers, and check valve means associated with said passageway means and being operative to permit flow of resistance liquid therethrough in only one direction of travel of said hollow piston rod.

9. In combination, a molding press including a movable platen member and an air actuated reciprocal type motor unit for actuating said platen member, said motor unit comprising a housing mounted on said press, a main piston including a piston head and a hollow piston rod disposed in said housing, said rod extending outwardly of said housing at one end thereof and being connected to said platen, a secondary piston including a piston head and a piston rod disposed in said hollow piston rod and dividing the latter into an upper and a lower chamber, the secondary piston rod being secured to said housing whereby the secondary piston is stationary relative to the main piston, and liquid checking means associated with said secondary piston and hollow piston rod for eliminating any erratic movement of said main piston upon actuation of said motor unit under load, said liquid checking means including means operating automatically in response to reversal of the stroke of the main piston head and hollow piston rod to at least partially deactivate said checking means and permit rapid return of said main piston head and hollow piston rod.

10. In combination, an air actuated reciprocal type motor unit comprising a cylinder closed at both ends, a main piston head disposed in said cylinder, a hollow piston rod secured to said piston head and extending outwardly to the exterior at one end of said cylinder, the exterior end of said hollow piston rod being closed and the other end of said hollow piston rod being open, a bearing sleeve mounted interiorly of said cylinder at said one end thereof and disposed in encircling guiding relation to said hollow piston rod, a secondary piston head disposed in fluid sealing relation in said hollow piston rod, a secondary piston rod secured to said secondary piston head at one end thereof and extending through the open end of said hollow piston rod and being attached at its other end to the other end of said cylinder, said main piston head and hollow piston rod being movable axially relative to said secondary piston head and attached secondary piston rod, means on the free exterior end of said hollow piston rod for attaching the same to a movable member, said closed end of said hollow piston rod and said secondary piston head defining a chamber therebetween adapted to receive resistance liquid therein, said secondary piston rod and secondary piston head having an axially extending passageway extending completely therethrough and opening at one end into said chamber and at the other end exteriorly of said other end of said cylinder, a conduit disposed in coupled relation to said other end of said passageway and extending to a reservoir adapted to contain resistance liquid therein, and a flow control valve disposed in said conduit and operative to pass resistance liquid therethrough in both directions corresponding to the directions of movement of said hollow piston rod, said valve including means providing a predetermined resistance to liquid flow in one direction of such liquid flow and operating automatically in response to reversal of the stroke of said main piston head and hollow piston rod to provide a materially lesser resistance to liquid flow in the opposite direction thereof.

References Cited in the file of this patent
UNITED STATES PATENTS

| | | |
|---|---|---|
| 706,276 | Stumpf | Aug. 5, 1902 |
| 2,428,640 | Smith | Oct. 7, 1947 |
| 2,490,625 | Hall | Dec. 6, 1949 |
| 2,664,859 | Green | Jan. 5, 1954 |
| 2,679,827 | Perdue | June 1, 1954 |